United States Patent [19]

Holovach

[11] Patent Number: 4,625,495
[45] Date of Patent: Dec. 2, 1986

[54] METHOD OF PACKAGING AND SYSTEM THEREFOR

[75] Inventor: John M. Holovach, Denville, N.J.

[73] Assignee: Mobil Oil Corporation, New York, N.Y.

[21] Appl. No.: 766,229

[22] Filed: Aug. 16, 1985

[51] Int. Cl.$^4$ .............................................. B65B 51/20
[52] U.S. Cl. ...................................... 53/450; 53/463; 53/550
[58] Field of Search ................. 53/450, 464, 463, 550, 53/548, 373; 493/192, 191, 190, 418, 450

[56] References Cited

U.S. PATENT DOCUMENTS 4,106,262  8/1978  Aterianus ............................... 53/450
4,483,125  11/1984  Suga ...................................... 53/450

*Primary Examiner*—James F. Coan
*Attorney, Agent, or Firm*—A. J. McKillop; M. G. Gilman; J. P. O'Sullivan, Sr.

[57] ABSTRACT

A method of individually wrapping items with a heat-sealable thermoplastic film overwrap including the use of heated streams of gas to form gussets at the end seals of the package and uniformly heat-sealing all layers of film at both ends of the packaged item. A system for carrying out this process is also described.

5 Claims, 2 Drawing Figures

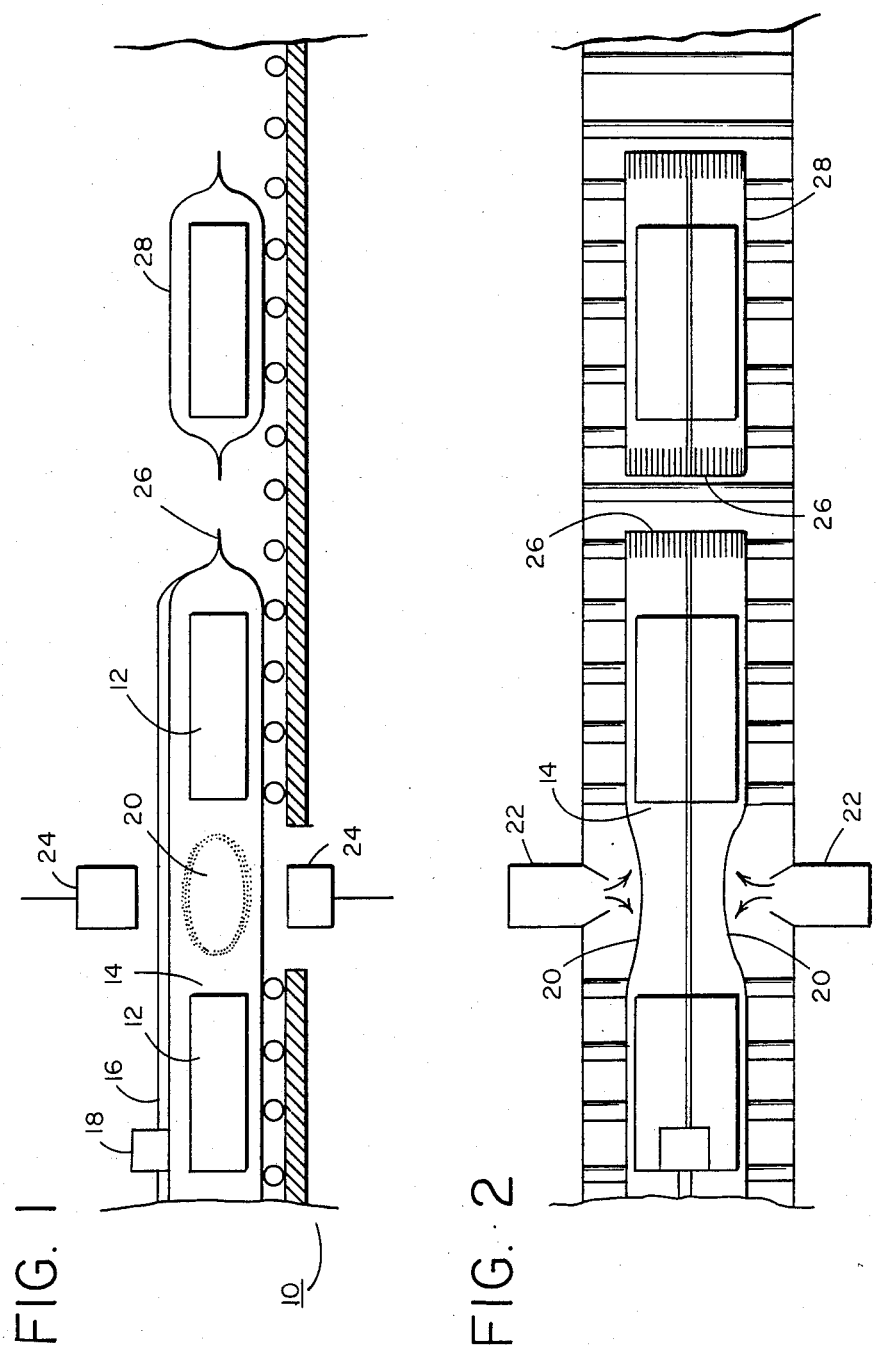

METHOD OF PACKAGING AND SYSTEM THEREFOR

The present invention relates to a method and a system for packaging items within a heat-sealable thermoplastic film overwrap and a system for accomplishing the same.

In the packaging of certain food or non-food items, such as trays or boxes containing cookies, hair curlers, and the like, or any self contained item such as a sponge, etc., it is known to overwrap the same with a thermoplastic film which is heat-sealable or which has a heat-sealable coating thereon. The item is first positioned inside of a sheath of thermoplastic film and a fin seal or an overlap seal maintains the film as a tubular structure about the tray. In order to effectively and neatly close the ends of the tray, it is known to employ either (1) a metal member or (2) an air jet to push the tube inwardly from opposite sides of the tube in order to begin gussets in the tube region beyond the end of the item to be packaged. Following this, a heated clamp or a jaw arrangement causes closure of the tube and, by conduction, heat from the jaws softens either the film or heat-sealable layer thereon and after cooling a crimp heat-seal type closure results. In this manner, the trailing end of one item to be packaged and the leading end of another item is sealed. Simultaneously or immediately following the heat seal step, the tube can be severed along a transverse line, through the seal so as to cause separation of the sealed portion of the tube.

It has been discovered that either because of proximity to the end heat sealing element or through friction the gusset forming means heats up causing sticking to occur between the thermoplastic film surface and the gusset forming means. The gusset forming means also interferes with the smooth feeding and traveling of the tubes at high speed. In extreme cases, the gusset member can be pulled by the film into the moving seal jaw, causing damage to the jaw, gusset member and other near-by devices. Expensive down time in order to temporarily eliminate the problem is the result.

The air jet does not touch the film and therefore this eliminates the friction problem, but the air has a cooling affect on the film and the heated seal jaw making control of temperature and forming of a complete seal difficult.

It is an object of the invention to present a process for the preparation of packaged items which includes a technique which avoids the problem of the prior art. It is yet another object of the invention to present a system designed to carry out this process.

SUMMARY OF THE INVENTION

The present invention is concerned with a method of packaging comprising:
(a) providing a series of spaced, in-line items to be packaged within a flexible heat-sealable film in tubular form;
(b) directing oppositely disposed heated streams of gas against the tubular film so as to effect heat-softened concave deformations in said tubular film between said spaced items;
(c) by application of two heated forces, collapsing said tubular film between said spaced items from a direction at least about normal to the streams of gas, causing said concave deformations to form collapsed, oppositely disposed, spaced-apart gussets, said heated forces being capable of heat-softening the film across the width of the tubular film;
(d) cooling all heated film surfaces to cause heat-sealing of contacting surfaces;
(e) severing the tube along a line at least generally midway of the heat-seal between said items; and
(f) serially repeating the process steps to form individual but seal-packaged items.

The present invention is also concerned with a system for preparing packaged items comprising in combination:
(a) means for providing a series of spaced, in-line items to be packaged within a flexible heat-sealable film in tubular form;
(b) means for directing oppositely disposed heated streams of gas against the tubular film so as to effect heat-softened concave deformations in said tubular film between said spaced items;
(c) means for the application of two heated forces, collapsing said tubular film between said spaced items from a direction at least about normal to the streams of gas, said means causing said concave deformations to form collapsed oppositely disposed, spaced-apart gussets, said heated force means being capable of heat-softening the film transverse of said tubular film;
(d) means for cooling all heated film surfaces to cause heat-sealing of contacting surfaces;
(e) means for severing the tube along a line at least generally midway of the heat-seal between said items; and
(f) means for serially operating the system to continuously form individual seal-packaged items.

BRIEF DESCRIPTION OF THE DRAWING

FIG. 1 is a side view of a section of a wrapping and sealing system of the present invention; and
FIG. 2 is a top view of the section of FIG. 1.

DETAILED DESCRIPTION OF THE INVENTION

While the system and process of the present invention can be employed to package practically any items, reference will be made to known systems for the wrapping of food items which are first placed in some type of container or tray, thereafter, heat-sealed within a thermoplastic film tube and, in some cases, the wrapped product is placed into a cardboard box for ultimate retail sale. As indicated above, the system employed for the subject packaging is one adapted to transport the items to be packaged in-line in a spaced advancing progression. As the items progress forward, they are fed onto a heat-sealable film. The film is then automatically closed about the items. The edges of the film are brought together so that a seal can be completed with the items enveloped within a tube of the thermoplastic film. The tubular form of the film is sealed by what is known as a "fin" seal which is made by heat-sealing two marginal borders of the film. At this stage of the packaging, the heat-sealed marginal borders stand upright at right angles to the surface of the package somewhat in the nature of a "fin", thus, the name. It is possible also to form the tube by overlapping the marginal borders of the film and heat sealing one to the other to form a "lap" seal. After the items to be packaged are encircled by the tubular film, each item must be isolated by the formation of seals at opposite ends of each item. By gusseting the tube between items to be packaged, neat heat-sealed ends can be formed by collapsing the tube to close the gussets with a heated member such as a crimp sealer. As the film layers of the collapsed tube are brought together the object is to heat-soften and compress the films sufficiently so that on cooling a strong heat-seal is effected. As indicated previously, problems are involved in this type of sealing. The prior art gusset forming mechanism includes two metal members which become heated by their proximity to the crimp sealing mechanism and by the fact that they are contacted by rapidly moving film. Convected heat and frictional forces raise the temperature of these members so that sticking occurs between them and the heat sealable film. The gusset forming device also interferes with the movement of the film tubes. In extreme cases it can be dragged into the seal jaw and cause excessive damage. This ultimately results in down-time for cleaning the metal members and cleaning any machine jamming.

Another problem with this section of the heat sealing system is that the heat-seal crimp apparatus must be capable of heat sealing together four layers of film in the region of gussets and two layers of film in the spaced region between gussets. If the heat sealing mechansim is adjusted to seal the two film region of the package it often times is insufficient to heat-seal the four layer region of the gussets. On the other hand if the crimp seal mechanism is adjusted to optimally seal the four film seal region of the gussets, it can be too hot for the two film center region of the tube.

An unheated air jet also compounds this problem by cooling the area of the film which requires heat most. It also cools the sealing jaw.

By the present invention, a prefect heat-seal is obtained in the region of both the four-film layer of the tube and the two-layer film of the tube and a total avoidance of any sticking during gusset formation is achieved.

Referring to FIGS. 1 and 2 of the drawing, 10 illustrates a section of a horizontal packaging system modified by the inclusion therein of the features of the present invention. In the Figures, items 12 to be packaged are positioned within a heat sealable thermoplastic film 14 in tubular form. The tubular form of the film is completed by forming a heat-sealed fin seal 16 by means of the heat seal mechanism 18. Two marginal regions of film 14 pass through heat-sealer 18 in face-to-face relationship and are heat-sealed together. Heat seal 16 may, alternatively, be a "lap" seal.

Between items 12 there are shown in tube 14 concavities 20 formed into both sides of the tube by hot streams of gas directed against the tube from jets 22. The air jets can operate in conjunction with any suitable air or gas supply controlled by a filter, a valve, a pressure gauge and a timer mechanism. The air can be heated by some suitable heat source, e.g. resistance wires, before passage through the air jets. The air streams can be continuous or pulsating at the same times per minute as the frequency of the number of items packaged. While the concavities exist, two oppositely disposed heated force means 24, e.g. heated jaws, are positioned approximately normal to the streams of heated gas. On actuation of these heated force means, they collapsed the tube, which in turn collapse the concavities 20, bringing the heat softened surfaces into face-to-face contact. By adjusting the temperature of the heated force means 24 so that it is appropriate for heat sealing two films, all regions of the four-layer and two-layer portions of the tube, on cooling, are effectivey heat-sealed. Conventional timing and pulsing means can be employed to sequentially operate the hot gas jets 22 to form the concavities 20, then these jets can be interrupted at the completion of the collapse of the tube by actuation of heated force 24. After completion of the collapse, the package moves out of the area so that while the films are still together the heat sealable surfaces can cool to complete the seal of the films.

In association with the heated force 24 a cutting or severing mechanism (not shown) can be built into or be immediately adjacent the heated force means 24. After heat-sealing has been completed the cutting mechansim can cut through the heat-sealed region separating the tube at the trailing edge of one item packaged and at the leading edge of another. The severance can ideally extend transverse of the sealed tube about midway in the heat-sealed region of the tube. Any suitable knife or guillotine mechansim can be employed for severing the packaged items 12. In a preferred system a knife is imbedded within heated jaw members. The crimp, heat-sealed and severed end of the item to be packaged is shown at 26 in the drawing. After a momentary stop in the operation of the system so that the several operations just described can take place, the system advances the individually packaged items 28 for further routine handling. These individually packaged items can then be sold as is or can be placed within an outer cardboard container to supply further protection and other packaging advantages.

A system which has all of the features necessary for the type of packaging defined herein and which can be modified by the present invention is a Doboy Super Mustang Wrapper available from Doboy Packaging Machinery, Inc. from New Richmond, Wisconsin 54017.

Any of the commercially available heat-sealable packaging films can be employed in the instant process and system. Examples of such films include polyolefin films, such films coated with heat sealable layers, paper stock with a heat sealable surface such as paraffin and the like, etc. A particularly preferred film for such packaging is oriented polypropylene film having a heat sealable coatings, e.g. Mobil Bicor ®220AB, thereon.

The hot gas jets 22 of the described system can be any means which will project a hot gas, e.g. air, $CO_2$, nitrogen, against the tube of film with sufficient force to form concavities which on collapse will form a gusset in the tube. The temperature of the heated gas must be sufficient to soften the heat-sealable surface of the film so that on collapse and at least moderate force, the heated surfaces will on cooling heat-seal together. Commercially available hot air guns of the type used in paint stripping can be used.

What is claimed is:
1. A method of packaging comprising:
   (a) providing a series of spaced, in-line items to be packaged within a flexible heat-sealable film in tubular form;
   (b) directing oppositely disposed heated streams of gas against the tubular film so as to effect heat-softened concave deformations in said tubular film between said spaced items;
   (c) by application of a heated force, collapsing said tubular film between said spaced items from a direction at least about normal to the streams of gas, causing said concave deformations to form collapsed, oppositely disposed, spaced-apart gussets, said heated force being capable of heat-softening the film in a region transverse of said tubular film;
(d) cooling all heated film surfaces to cause heat-sealing of contacting surfaces;
(e) severing the tube along a line at least generally midway of the heat-seal between said items; and
(f) serially repeating the process steps to form individual heat-seal packaged items.

2. The method of claim 1 wherein said gas is air and said heat-sealable film is a polypropylene film having heat sealable surfaces.

3. The method of claim 1 wherein said severing occurs simultaneously with said step (c).

4. A system for preparing packaged items comprising in combination:
(a) means for providing a series of spaced, in-line items to be packaged within a flexible heat-sealable film in tubular form;
(b) means for directing oppositely disposed heated streams of gas against the tubular film so as to effect heat-softened concave deformations in said tubular film between said spaced items;
(c) means for the application of a heated force, collapsing said tubular film between said spaced items from a direction of at least about normal to the streams of gas, said means causing said concave deformations to form collapsed oppositely disposed, spaced-apart gussets, said heated force means being capable of heat-softening the film in a region transverse of said tubular film;
(d) means for cooling all heated film surfaces to cause heat-sealing of contacting surfaces;
(e) means for severing the tube along a line at least generally midway of the heat-seal between said items; and
(f) means for serially operating the system to continuously form individual heat-seal packaged items.

5. The system of claim 4 wherein said severing means operates simultaneously in conjunction with said heated force means.

* * * * *